United States Patent [19]

Deja

[11] Patent Number: 5,526,926
[45] Date of Patent: Jun. 18, 1996

[54] STORAGE CASE FOR COMPACT DISCS

[75] Inventor: Günter Deja, Overath, Germany

[73] Assignee: Viva Magnetics Limited, Hong Kong, Hong Kong

[21] Appl. No.: 235,516

[22] Filed: Apr. 29, 1994

[30] Foreign Application Priority Data

Apr. 29, 1993 [DE] Germany .............................. 9306430 U
Aug. 17, 1993 [DE] Germany .............................. 9312288 U

[51] Int. Cl.⁶ .................................................. B65D 85/57
[52] U.S. Cl. .................................. 206/308.1; 206/310
[58] Field of Search ................... 206/308.1, 310, 206/493

[56] References Cited

U.S. PATENT DOCUMENTS 4,793,479  12/1988  Otsuka et al. ..................... 206/308.1

FOREIGN PATENT DOCUMENTS 0356539  8/1988   European Pat. Off. .
0429195  10/1990  European Pat. Off. .
3425579  1/1986   Germany .
3715187  11/1988  Germany .
4107218  9/1992   Germany .
0205589  8/1990   Japan ................................... 206/310

*Primary Examiner*—Bryon P. Gehman

[57] ABSTRACT

A storage case for a disc-shaped information carrier such as a compact disc. The case has a receptacle member and a base, which is substantially fitted to the outline of the disc, inserted into the receptacle member. The base member is provided with a central retaining element which passes through the clearance in the center of a compact disc and has spring-catches developed as a locking element which overlap the inner edge of the clearance of the disc for securing the disc within the case. A push-button type release is provided for releasing the disc from the case. As the push button is pressed, finger-like lifting elements pivot on support arms to lift the compact disc above the central retaining element, and thereby freeing the compact disc from the case.

15 Claims, 4 Drawing Sheets

5,526,926

STORAGE CASE FOR COMPACT DISCS

BACKGROUND OF THE INVENTION

1. Field of the Invention

The invention concerns a storage case for a disc-shaped information carrier with a clearance in the central area, for an optically readable digital audio-disc otherwise known as a compact disc or CD. In particular, the storage case has a receptacle member and a base member, which is substantially fitted to the outline of the disc and inserted into the receptacle member. The base member is provided with a central retaining element which passes through the clearance of the disc and has spring-catches developed as a locking element which overlap with a thickening of the inner edge of the clearance of the disc pointing radially outwards.

2. Description of the Related Art

Storage cases of this type have cap-like spring-catches which are disposed as retaining elements which can be connected with the clearance of the disc. This connection is frequently so tight that the disc can only be removed from the case with some difficulty. As the spring-catches have end members directed radially inwards, at times it is possible to press on these ends with the index finger and thereby to bend back at least a part of the spring-catch, such that the click-stop connection between the retaining element formed by the spring-catches and the clearance of the disc, even if it is not fully released, is nevertheless loosened and it is possible to remove the disc.

In DE-C2-34 25 579 a storage case of the foregoing type is described, for which removal is made easier in that the spring-catches towards the inside have a fixed attachment inwards to a pressure plate. It is possible for the attachment to be elastically produced such that it can be deformed such that at the time of a deformation of the pressure plate, by means of pressure applied with a finger, the spring-catches are arched inwards and therefore the click-stop connection between a retaining element and the clearance of the disc are released. Removal of the disc should be facilitated in that spring elements are provided which are depressed by the inserted disc and when the pressure plate is pressed down, these spring elements push upwards from the back of the disc through the click-stop of the spring-catches. As, however, the base members of this type of case are mass-produced products and allowable variation can be present throughout, an insufficient or loose locking between a retaining element and the disc is sometimes produced. The arrangement of these types of spring elements have the disadvantage that the spring elements release the disc from the retaining element without pressure on the pressure plate, so that the precise purpose of a safe retention of the disc is not guaranteed.

A traditional kind of storage case is furthermore known from DE-A1-37 15 187, in which a spider-like body with arms bent back upwards is inserted into the central boring and the slots in the base member which partition the spring-catches. The arms being developed so that the ends of the arms come upwards out of the slots through a pressure on the body and should lift out the inserted disc. This storage case has the disadvantage that when there is a pressure on the body, the whole force must be applied in overcoming the force of retention exerted by the arms. As the arms can be deformed because of the way they are fashioned, the transmissible force is not sufficient in some cases where there is a large retaining force to overcome the device for locking the spring-catches.

SUMMARY OF THE INVENTION

The primary purpose of the present invention is to improve storage cases of the type for storing disc-shaped information carriers, such as compact discs.

This purpose is achieved by the invention because at least two lifting elements are provided which lie under the edge of the disc in the area of the locking element, and an actuation means for deliberate release of the locking means and for acting on the lifting elements is provided. This arrangement has the advantage that the locking mechanism or click-stopping mechanism between the spring-catches and the disc are lifted by the actuation means and at the same time the disc is lifted over the locking element by the lifting elements, so that the disc remains released when the actuation means is released. The handling is in this way made considerably more easy. The insertion of the disc occurs in the normal way by means of pressing it onto the retaining element.

In a preferred design of the invention, it is provided for that at least a section of the spring-catches developed as locking means is in each case connected with a finger-like lifting element extending radially outwards in the plane of the base member. This arrangement has the advantage that the locking means and the lifting elements can be manufactured as a single section of the base member. The further advantage is that the user, when handling this type of case by means of pressure on the free ends of the spring-catches that he or she is accustomed to, does not only lift the click-stopping mechanism between the retaining element and the disc, but the disc is also lifted over the click-stopping mechanism by means of the lifting elements in an intended process of movement. An unintentional release if, as a result of falling below allowable limits of variation, there is only weak locking between the disc and the retaining element, is therefore avoided even in this situation. It is particularly appropriate if the lifting element is provided with a support arm on its underside which lies on the bottom of the receptacle member separated from the associated spring catch. This produces an exactly defined lever effect for the lifting element when the free end of the spring-catch connected with this lifting element is pressed on. Appropriately, the spring-catches connected with a lifting element are connected to the attachment member by means of spring webs acting in particular like torsion springs. This enables execution as a single piece in a simple way in which the base member, the spring-catches and the lifting elements can be manufactured in one fashioning process.

In an appropriate further design of the invention, it is provided for that the free ends of the spring catches, which are provided with lifting elements, are in each case provided with radially inwardly directed extensions to form a push-button surface. This arrangement has the advantage that a relatively large lever arm is available for applying the lifting-pressure, such that the handling is further facilitated. The extensions hereby have at least the same thickness as the spring-catches such that the head member of the relevant spring-catches formed by the extensions is relatively rigid, such that a secure releasing of the locking mechanism is ensured.

In a further design, it is provided for that the push-button is formed by a head which is inserted unfixed such that it is form-locking. This design has the disadvantage certainly that this type of storage case requires insertion of a second component at the time of manufacturing. As, however, there is only a simple head in this case, which does not have to be inserted in an exact arrangement, this can also be accomplished in an automatic assembly operation. The advantage is that the inserted head can have a different color than that of the inserted base member, so that convenient instructions concerning handling can be given to the user, in particular, in the situation where the user has cases in accordance with the invention and traditionally designed cases.

In a variation of the invention, the inserted head can be connected with the finger-like lifting elements disposed in the intermediate space between the spring-catches, instead of being connected with the spring-catches. The advantage is that the lifting elements can be developed essentially rigid and only have to be developed as a type of spring film hinge in the area of the connection with the head. This guarantees that relatively large forces can be transmitted without the lifting elements themselves deforming. The lifting elements are disposed radially on the head which is appropriately form-lockingly connected to the free ends of the spring-catches by means of a surrounding band, such that the lifting elements can, in each case, move freely in the intermediate space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
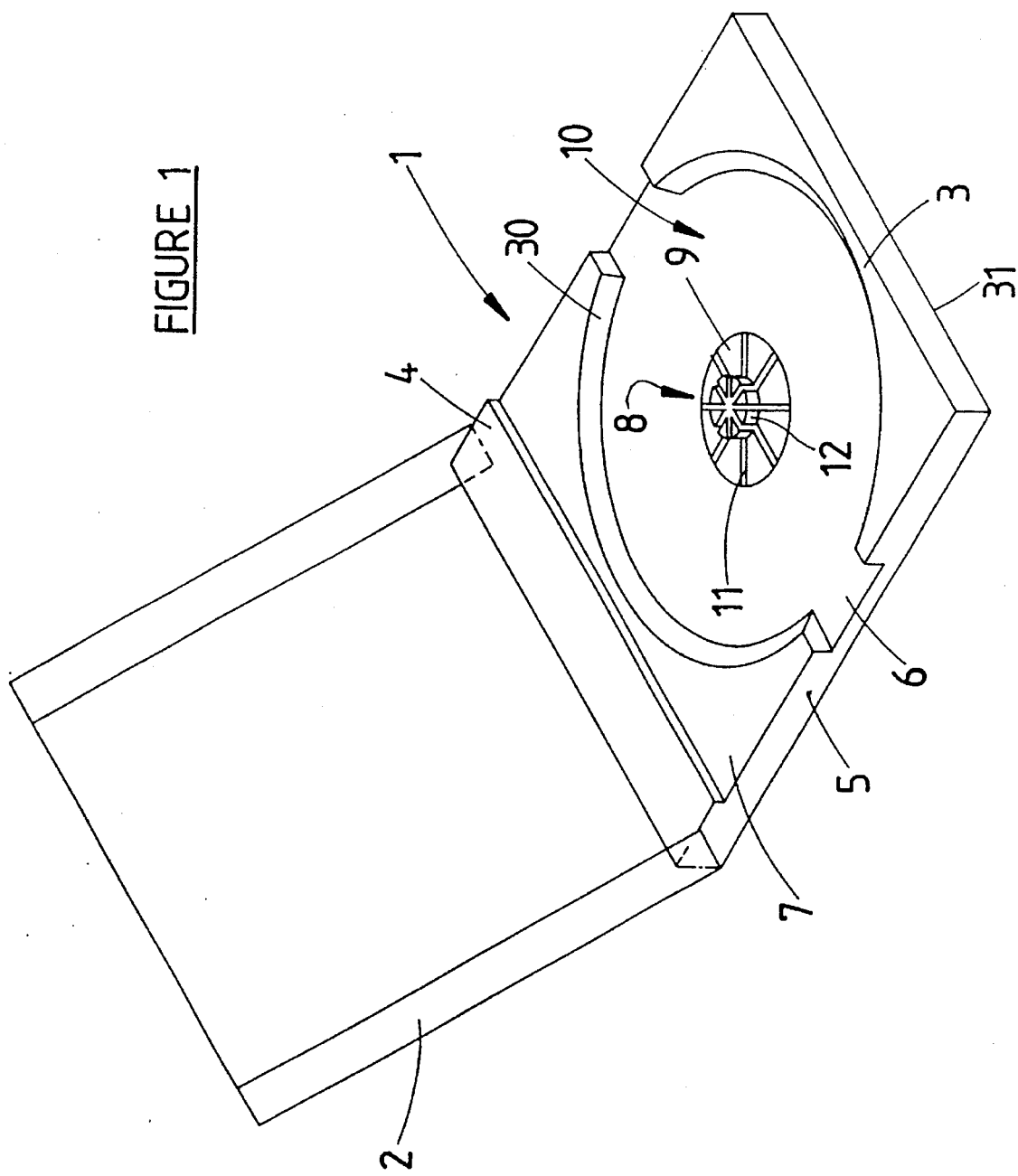
FIG. 1 is a perspective view of a storage case according to the present invention.

The storage case 1, shown in FIG. 1 for a disc-shaped information carrier, hereafter referred to as a compact disc (CD), has a lid 2, and a receptacle member 31 into which a base member 3 is inserted, so as to be form-locking. The base member being essentially fitted to the outer outline of a CD. The base element 3 and receptacle member 31, are conceived so that side surfaces 5, adjoining on both sides on the retaining and joint edge 4, are provided with clearances 6 on both sides, into which the edge of an inserted CD extends slightly and thereby can be held by a hand, between the thumb and middle finger. On the other sides, the base member 3, is configured to surround the inserted CD around the peripheral edge. The surfaces of the wedge-shaped area 30 hereby formed in the corners lie slightly above the surface of an inserted CD.

The base member 3, has a central retaining element 8, which is surrounded in its base area by a support surface 9. The support surface 9 is slightly higher than the general bottom area 10, of the base member 3, such that an inserted CD lies on the contact surface 9, with its central area which is not played. The CD therefore, does not touch the general bottom area 10 of the base member 3.

The central retaining element 8 is, as mainly shown in FIG. 1, a cylindrical pin. The cylindrical pin is provided with a collar projecting outwards on its upper edge, the diameter of which is slightly enlarged on the upper open end. The pin is divided by several radial slits 11, which extend to the area of the support surface 9, such that they form spring-catches 12, which are hook-shaped as seen sideways. A CD to be stored can be pressed onto this pin through its central clearance and is then click-locked into position in accordance with the type of push-button employed.

Figure 2:
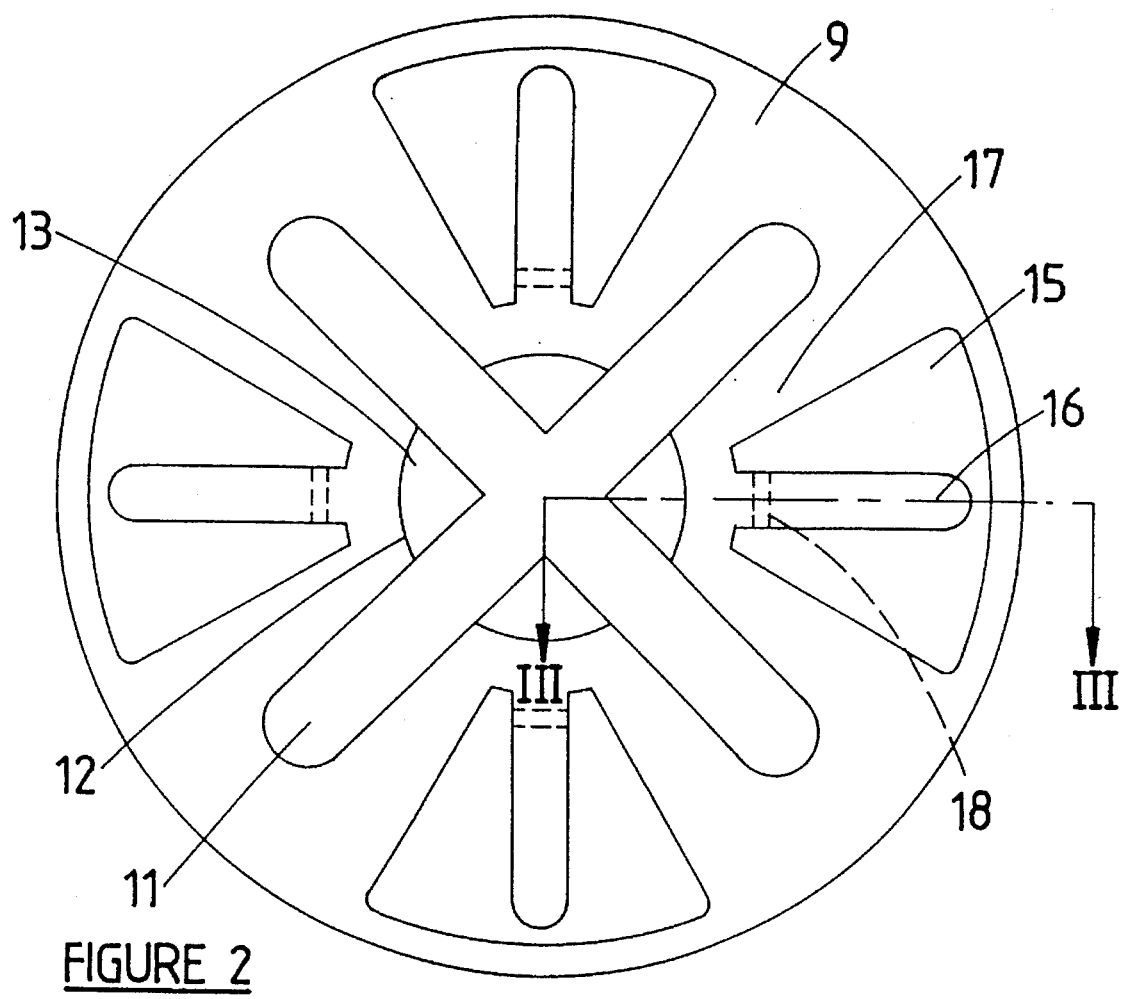
FIG. 2 is an enlarged top view of a central retaining element according to the present invention.
Figure 3:
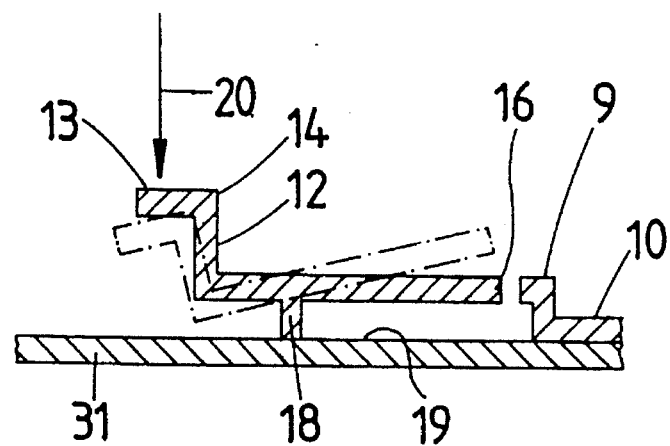
FIG. 3 is a section through the central retaining element along the line III—III as indicated in FIG. 2, with a lifting element connected so as to form a single piece.

FIGS. 2 and 3 show a large scale representation of a design with a combined locking means and lifting element. The pin forming the retaining element 8, is divided into four sections, which form the spring-catches 12 and which have a cover member 13 directed inwards, by means of the above-mentioned radial slits 11 of which only four are provided in the case of the represented design. The individual spring-catches 12 are provided with a slight projection 14 on their upper edge, on their outer rim, as an extension of the cover member 13, as can be seen from FIG. 3, the slight projection 14, together with the central clearance, forming the push-button-type locking connection.

A U-shaped recess 15 is provided, in the sections of the support surface 9, lying between two slits 11, which separates a finger-like lifting element 16 from this area of the base member 3, the lifting element 16, lying in the plane of the support surface 9. The U-shaped recess ends in each case, at a slight distance from the slits 11 so that a connection web 17 remains on both sides. At least one support arm 18 is provided on the underside of the retaining element 8 in the area of the finger-like lifting element 16, the support arm lying on the bottom 19 of the receptacle member 31.

If one now presses on the cover section 13 of the spring-catches 12 in the direction of the arrow 20 (FIG. 3) then the spring-catch 12 tilts downwards around the support arm 18 as can be seen from FIG. 3, such that the connection webs 17 act like torsion springs. The projection 14 is hereby pulled back such that the central clearance of the inserted disc can be removed upwards. Because the lifting element 16 is pivoted upwards, as can also be seen from FIG. 3, because of its fixed connection with the spring-catch 12, the central clearance of the inserted disc is lifted over the level of the projection 14 at the same time as the unlocking produced by the pulling back of the projection 14. If the finger pressure is released, then the spring catch 12, with its collar 14, forming the locking means, springs back without overlapping the edge of the central clearance of the disc, because the lifted disc has already been held at the edge by the same hand or the other hand.

Figure 4:
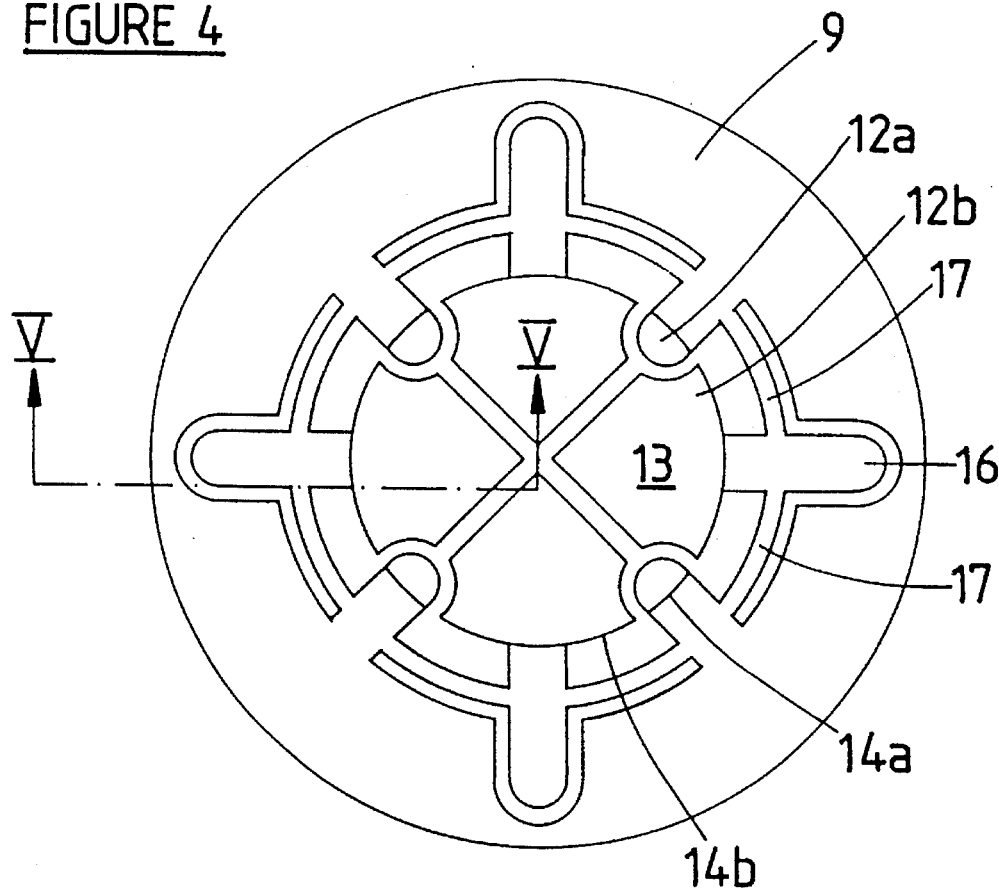
FIG. 4 is a view of a single-piece embodiment with a large push-button surfaces.
Figure 5:
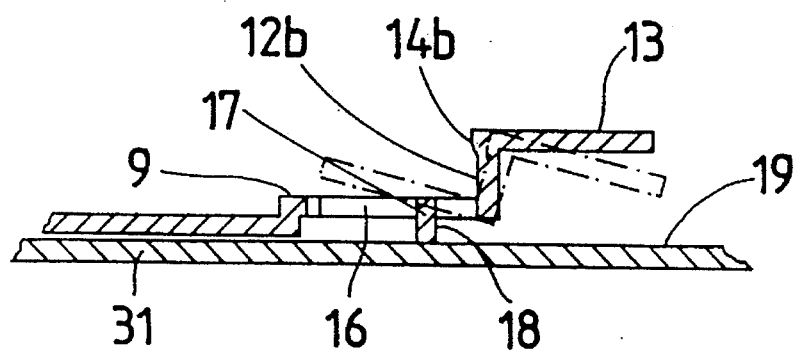
FIG. 5 is a section along the line V—V of FIG. 4.

FIGS. 4 and 5 show a particularly advantageous design in which a section of the spring-catches 12a which are provided with a projection 14a which acts exclusively as a locking mechanism, while the other section of the locking spring-catches 12b are connected to the finger-like lifting elements 16. The spring-catches 12b are provided in each case with an extensive cover member 13 which forms an integrated push-button surface. The projections 14b are the same as the projections 14 in the previous embodiment. The spring-catches 12a are recessed into the cover member in the area of the slits 11. The spring-catches 12b and lifting elements 16 which in each case form a unit, are connected with the support surface 9 on the base member 3, as a single piece, by means of the webs 17 acting as torsion springs. The lifting elements 16 extend to the edge of the raised support surface 9. A support arm 18 is disposed in each case on the underside in the area of the webs 17, the support arm 18 lying on the bottom 19 of the receptacle member 31, such that a specific swivelling movement of the finger-like lifting element 16 is produced. The webs 17 can have a right-angled cross-section the greatest dimension of which runs perpendicular to the plane of the support surface 9, such that torsion is achieved without a bending round. The webs 17 can also be proportioned such that they have the function of support arms.

Figure 6:
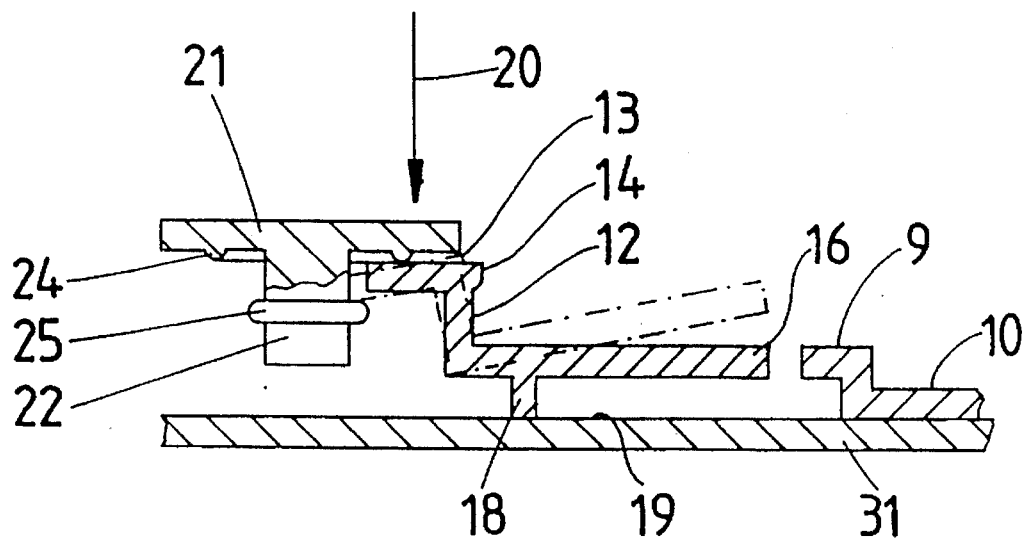
FIG. 6 is a section view of a third embodiment with an inserted lifting element.

FIG. 6 shows the arrangement of the central retaining element of FIGS. 2 and 3 with a head 21 serving as a push-button surface. The head 21 is provided with a pin 22 which is positioned in the free space between the ends of the spring-catches. The pressure force is transmitted to the spring-catches by means of a circular surrounding projection 24 on the underside of the head 21. The head 21 is loosely locked with the ends of the spring-catches which point inwards, by means of a collar 25 on the pin 22, and is therefore secured against falling out.

Figure 7:
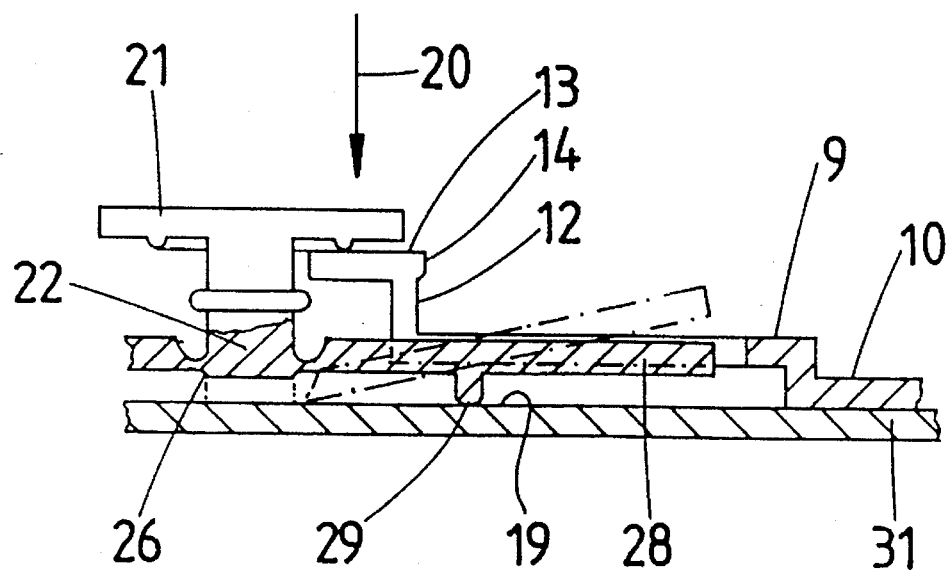
FIG. 7 is a section view of a fourth embodiment with an inserted lifting element.

In the case of the variation in accordance with FIG. 7, the finger-like lifting elements 28 are connected to the pin 22, by means of a hinge joint 26. The finger-like lifting elements 28 lie in the intermediate space formed by the radial slits 11 between the spring-catches 12, such that such an element can also be subsequently inserted into a traditional storage case. The finger-like elements 28 with their pin ends turned towards each other, are pressed down by pressing on the surface of the head 21, such that their free ends swivel upwards about the support arm 18 and press the inserted CD upwards. Hereby also, the spring-catches 12 are pushed downwards by means of the head 21 and the stopping divide between the projection 14 and the inner rim of the disc are at least loosened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A storage case for a disc-shaped information carrier with a clearance in a central area, comprising:

a receptacle member with a base member inserted therein;

said base member being substantially fitted to the outline of an information carrier inserted therein, said base member being provided with a central supporting portion, said base member being further provided with a central retaining element which passes through the clearance of the information carrier;

said central retaining element having at least two independently actuatable spring-catches forming a locking element, each spring-catch having an outwardly projecting portion which overlaps the inner edge of the clearance of the information carrier, each spring-catch further comprising a substantially rectilinear lifting element extending radially outward from the spring-catch along a radially directed line through the spring-catch and lying under the edge of the information carrier within a plane defined by said supporting portion of said base member in the area of the locking element, and an activation means for deliberate release of the locking element and for actuating the lifting element.

2. The storage case according to claim 1, wherein the spring-catches are connected with the base member by means of connection webs.

3. The storage case according to claim 2, wherein the lifting elements are each provided with a support arm on the lifting element underside which lies on a bottom portion of said receptacle member.

4. The storage case according to claim 3, wherein free ends of the spring-catches are provided with radially inwardly directed extensions to form a push-button surface.

5. The storage case according to claim 4, wherein said push-button is formed by a head which is inserted unfixed such that it is form-locking.

6. The storage case according to claim 4, wherein said push-button is formed by a head which is connected with said lifting elements and said lifting elements are disposed in an intermediate space between the spring-catches.

7. The storage case according to claim 2, wherein free ends of the spring-catches are provided with radially inwardly directed extensions to form a push-button surface.

8. The storage case according to claim 7, wherein said push-button is formed by a head which is inserted unfixed such that it is form-locking.

9. The storage case according to claim 7, wherein said push-button is formed by a head which is connected with said lifting elements and said lifting elements are disposed in an intermediate space between the spring-catches.

10. The storage case according to claim 1, wherein the lifting elements are each provided with a support arm on the lifting element underside which lies on a bottom portion of said receptacle member.

11. The storage case according to claim 1, wherein free ends of the spring-catches are provided with radially inwardly directed extensions to form a push-button surface.

12. The storage case according to claim 11, wherein said push-button is formed by a head which is inserted unfixed such that it is form-locking.

13. The storage case according to claim 11, wherein said push-button is formed by a head which is connected with said lifting elements and said lifting elements are disposed in an intermediate space between the spring-catches.

14. A storage case for a disc-shaped information carrier with a clearance in a central area, comprising:

a receptacle member with a base member inserted therein;

said base member being substantially fitted to the outline of an information carrier inserted therein, said base member being provided with a central supporting portion, said base member being further provided with a central retaining element which passes through the clearance of the information carrier;

said central retaining element having a plurality of spring-catches developed as a locking element pointing radially outward which overlap with the inner edge of the clearance of the information carrier, each spring-catch further comprising a substantially rectilinear lifting element extending radially outward from the spring-catch along a radially directed line through the spring-catch and lying under the edge of the information carrier within a plane defined by said supporting portion of said base member in the area of the locking element, and an activation means for deliberate release of the locking element and for actuating the lifting elements;

wherein the spring-catches are connected with the base member by means of connection webs;

wherein the lifting elements are each provided with a support arm on the lifting element underside which lies on a bottom portion of said receptacle member; and wherein free ends of the spring-catches are provided with radially inwardly directed extensions to form a push-button surface.

15. The storage case according to claim 14, wherein each of the spring-catches is independently actuatable.

* * * * *